United States Patent [19]

Ishida

[11] Patent Number: 5,591,475
[45] Date of Patent: Jan. 7, 1997

[54] HIGHLY WATER ABSORBED RICE, METHOD FOR PRODUCING SAME AND APPLICATION OF SAME

[76] Inventor: Yukio Ishida, 1-15, Ejirihigashi 2-chome, Shimizu-shi, Shizuoka-ken, 424, Japan

[21] Appl. No.: 562,754

[22] Filed: Nov. 27, 1995

Related U.S. Application Data

[63] Continuation of Ser. No. 137,007, filed as PCT/JP93/00134, Feb. 4, 1993, published as WO93/16604, Sep. 2, 1993, abandoned.

[30] Foreign Application Priority Data

Feb. 19, 1992 [JP] Japan .................................. 4-069814
Apr. 7, 1992 [JP] Japan .................................. 4-113162

[51] Int. Cl.$^6$ ..................................................... A23L 1/182
[52] U.S. Cl. ........................ 426/627; 426/455; 426/509; 426/524; 426/640
[58] Field of Search ................................ 426/285, 618, 426/627, 640, 455, 468, 509, 510, 511, 512, 520, 524

[56] References Cited

FOREIGN PATENT DOCUMENTS

| 0122225 | 11/1983 | European Pat. Off. . |
|---|---|---|
| 1536242 | 5/1967 | France . |
| 115151 | 7/1982 | Japan . |
| 73229 | 5/1984 | Japan . |
| 59-118055 | 7/1984 | Japan . |
| 16559 | 1/1985 | Japan . |
| 79412 | 5/1989 | Japan . |
| 0422491 | 7/1933 | United Kingdom . |

OTHER PUBLICATIONS

Japanese Patent Abstract JP2291235; published 1991; AN:91–018828 by WPI/Derwent.
Japanese Patent Abstract, JP3198756, Nov. 27, 1991, vol. 15, No. 467.
Japanese Patent Abstract, JP4218348. published Feb. 12, 1992; vol. 16, No. 560.

*Primary Examiner*—Anthony J. Weier
*Attorney, Agent, or Firm*—Browdy and Neimark

[57] ABSTRACT

A method for making hydrated rice by preparing in a first stage a hydrated rice of a water content of 38 to 115 parts by weight of water to 100 parts by weight of rice, using hot water, steam and/or steam under pressure, subjecting the resulting hydrated rice to refrigeration or/and freezing, and making the rice further absorb water at a second stage, whereby the total water absorption is 72 to 130 parts by weight to 100 parts by weight of water. The rice grains of the highly hydrated rice are ungelatinized.

When attempting to prepare a highly hydrated rice, a certain degree of gelatinization of the surface conventionally cannot be avoided, so that the taste is deteriorated and the occurrence of gelatinization makes the handling difficult.

The highly water absorbed rice of the present invention, even after being cooked and heated, has a hard surface and soft interior, providing a delicious taste, so that the rice turns into tasty boiled rice. If freeze dried, the rice turns into excellent instant rice.

3 Claims, No Drawings

HIGHLY WATER ABSORBED RICE, METHOD FOR PRODUCING SAME AND APPLICATION OF SAME

This application is a continuation of application Ser. No. 08/137,007, filed as PCT/JP93/00134, Feb. 4, 1993, published as WO93/16604, Sep. 2, 1993, now abandoned.

FIELD OF THE INVENTION

The present invention relates to a highly hydrated rice in which the rice grains are substantially, which can be used as a raw material for a variety of boiled rice products, a method for producing the same and the application of the same.

The present invention relates to boiled rice, processed boiled rice, seasoned boiled rice, molding processed boiled rice, instant dry rice and the like.

BACKGROUND OF THE INVENTION

Hydrated rice has been produced conventionally by immersing raw rice in water or hot water for a long period of time. However, the water absorption of conventional hydrated rice is insufficient, so that a relatively larger amount of water has been needed for cooking such rice or preparing fried rice. It is disadvantageous that tasty cooked rice, being overall soft but having a slightly hard surface, cannot be obtained for a short time when a greater amount of water is added prior to heating. This represents how difficult it is to determine an appropriate amount of water, specifically that it is extremely difficult to constantly prepare homogeneous and tasty products although a package of such product for one meal is small in volume.

Furthermore, for producing rice balls and the like by using molds, conventionally, rice is once steam-boiled and prepared into α type, which is then packaged into molds followed by molding under pressure and heating over direct flame to prepare baked rice balls and the like.

However, rice completely prepared into α type is already in the form of boiled rice, where the grains stick together due to the Starch on the surface, and the rice is packed in molds with much difficulty, and the continuous mechanical production of a greater amount of rice balls is very difficult, which induces troublesome works in machine washing and is expensive. In case that the rice prepared into the form of boiled rice is molded under pressure, the grains get mashed if the rice is too strongly compressed and the products if gently steamed again lose the shape immediately, so that such rice has a disadvantage in that the rice cannot be processed widely other than in the form of baked rice balls.

SUMMARY OF THE INVENTION

A first object of the present invention is to produce a highly hydrated rice by making rice grains absorb an amount of water necessary to convert rice grains into boiled rice while maintaining the state of nearly no gelatinization; by further using the highly hydrated rice, a second object of the present invention is to produce tasty boiled rice products such as a variety of boiled rice products and molded boiled rice, which products have a somewhat hard grain surface and a fluffy inside and are soft to the teeth without requiring difficult adjustment of water.

MEANS FOR SOLVING THE PROBLEMS

In accordance with the present invention, the production of a highly hydrated rice has been successfully achieved by enforcing individual processes such as refrigeration, freezing, freezing after refrigeration or refrigeration after freezing, between the first-stage water absorption and the second-stage water absorption.

DETAILED DESCRIPTION OF THE INVENTION

The present invention relates to a highly hydrated rice produced by making 100 parts by weight of rice absorb 72 to 130 parts, preferably 80 to 125 parts by weight of water while the retaining rice grains substantially ungelatinized.

The highly hydrated rice of the present invention can be prepared into α type and cooked with microwave ovens, ovens and the like for an extremely short time without addition of water. The rice is also preferable as a raw material for preparing a variety of processed boiled rice such as rice gruel, rizzotte and the like.

In accordance with the present invention, first-stage water absorption and second-stage water absorption should essentially be required before and after the processes of refrigeration or/and freezing, but the gelatinization of rice grains should be avoided in any such water absorption. The taste of the rice with a gelatinized grain surface, even if cooked, is badly deteriorated because the grain surface is still further gelatinized.

The present invention provides a method for preparing hydrated rice with a water content of 38 to 115 parts, preferably 45 to 100 parts by weight to 100 parts by weight of rice by using hot water at 60° C. or more, and or steam and/or steam under pressure.

Subsequently, refrigeration or/and freezing process is carried out, but the final water absorption level varies, depending on whether refrigeration process or freezing process is carried out, so that refrigeration process or/and freezing process should preferably be done, depending on the objective water absorption level, namely the use of the highly water absorbed rice.

In the refrigeration process, storage under refrigeration is done at 10° to 0° C. for about one day, preferably three days or more. After the refrigeration process, second-stage water absorption is effected using water at about 15° to 25° C., and the final water absorption level is at most about 85 to 100 parts by weight of water to 100 parts of rice. If the water absorbed rice is further immersed in lukewarm water at about 25° to 45° C., up to about 110 parts by weight of water may be then absorbed without the occurrence of grain gelatinization.

In freezing process or rapid freezing process, freezing is effected at −20° C. to −80° C. for 20 minutes or more, preferably one day or more. After the freezing process, second-stage water absorption is effected, and the final water absorption level may be freely modified in the range of 72 to 130 parts by weight of water to 100 parts by weight of rice.

The first-stage water absorption is effected by adding to water preferably at 60° C. to 100° C., or by simultaneously or individually processing the rice in steam or steam under pressure, whereby 38 to 116 parts by weight of water is absorbed into 100 parts by weight of rice. In this case, there may be another process comprising once again heating the rice at 60° C. or more and charging the rice into water at a temperature lower by several centigrade degrees for water hydration, whereby a given amount of hydration is completed. The water absorbed rice thus processed is transferred to refrigeration or/and freezing processes.

The second-stage water absorption is effected by adding the hydrated rice through refrigeration or/and freezing process into water, lukewarm (hot) water, broth, soup, sauce and the like, at 0° C. to 100° C., whereby 72 to 130 parts by weight of water is absorbed into 100 parts by weight of rice. When water at a high temperature is used at the second-stage water absorption, care should be taken so as to complete such immersion for a short time to prevent the rice grains from gelatinizing. As has been described in the previous section, water absorption may be completed by charging the rice once at a raised temperature into water, lukewarm water, broth, soup, sauce and the like at a temperature lower by several centigrade degrees.

Since the rice grains of the highly hydrated rice obtained by the two water absorption steps before and after refrigeration or/and freezing processes, in accordance with the present invention, contain a great amount of water with substantially no gelatinization, there can be produced products almost comparable to rice cooked with conventional rice cooking methods or to those produced by processing the cooked rice; and at a larger scale, there can be produced novel boiled rice foods which have conventionally never been produced. Because the highly water absorbed rice of the present invention is refrigerated or frozen prior to storage and then processed with heating at another place, whereby tasty boiled rice foods thoroughly prepared into α type, can be prepared, industrial merits of the large-scale production, such as the large scale preparation of semi-products for the preparation of very hot boiled rice foods at another place, will not be accurately estimated.

Because the highly hydrated rice of the present invention is in the state of a great amount of water absorption although substantially not gelatinized; the rice can readily be prepared completely into α type in an extremely short time on heating afterwards with almost no addition or no addition of water. This hydrated rice is then prepared into tasty boiled rice having a soft feel to teeth, and a slightly tough surface while being soft inside. In the highly hydrated rice of the present invention, a greater amount of water absorption is realized through a relatively high extent of α-type preparation via the first heating and a certain degree of aging through refrigeration and freezing without gelatinization.

Although rice of a lower water content, for example, rice of a water absorption level of 72 to 110 parts by weight in the highly hydrated rice of the present invention, is used for preparation of molded boiled rice, this rice having a lower water content is substantially ungelatinized; and therefore can be continuously charged freely at a constant amount into molds. The rice in the mold is heated with lukewarm (hot) water, steam, steam under pressure, an autoclave, direct flame and the like and then prepared into delicious, molded boiled rice.

As the mold to be used in accordance with the present invention, use may be made of a variety of molds, such as plastic-, or teflon-made molds, metal-made molds processed with teflon, in the forms of a rice ball, stick, box and the like. In accordance with the present invention, only one mold may be needed for consistent production from initial stage to final products as molded boiled rice, or an initial mold may be used for pressurizing the hydrated rice or heating the rice with lukewarm water or in steam for tentative molding, and subsequently taking out the molded rice and transferring the rice into another mold or a molding box for heating the rice with lukewarm (hot) water, steam, steam under pressure, an autoclave, a microwave oven, direct flame or the like to prepare the final products. If replacing a mold and/or a molding box, the subsequent mold should be somewhat larger than the initial mold for easy handling, and the one where a molding box is arranged on a plastic plate or an iron plate can achieve satisfactory molding, depending on the initial process or the heater to be used, which is very simple.

If molded boiled rice is prepared with the same mold from the initial stage to the final stage, the transferring thereof is not necessary, so such process is simple, but the highly hydrated rice expands when the rice is prepared into boiled rice, which may be then prepared into slightly compressed, molded boiled rice. If heating is effected after transferring into a mold or a molding box of a slightly larger size, however, handling is easy, and molded boiled rice at a just appropriate toughness may be prepared due to the expansion of the rice at the preparation of boiled rice. If a mold is replaced with another mold and/or a molding box so as to effect transferring therein, it is needless to say that the operation in mechanical operation and steam cooking is extremely readily made consistent, advantageously, and the washing after use is made extremely easy.

Using as such mold the ones in appropriate forms such as rice ball, box, stick, flat plate, molded rice, sushi, rectangular parallelepipeds, cube, cylinder, funnel and the like, the highly water absorbed rice is poured into the molds, followed by applying a high pressure in continuous manner or a batch-wise manner for molding, or followed by slightly heating the rice at 50° to 100° C. with hot water or/and steam to tentatively mold the rice grains at a degree at which the grains might not be separated. It is needless to say that both of them may be used in combination. After the tentative molding, heating is effected in the same mold or after the rice is transferred into another mold and/or a molding box, a laminated package or the like, with steam at 60° to 100° C., steam under pressure at 100° to 110° C., with an autoclave, a microwave oven, direct flame and the like for molding.

In case that pickled ume or a cooked product is inserted as an ingredient into the molded processed boiled rice, about half of the highly hydrated rice is poured into a mold, into which is then inserted the ingredient followed by pouring the highly hydrated rice over the ingredient for tentative molding, and subsequently, in the same mold or after transferred into another mold or a molding box, the rice is heated and molded. Alternatively, the ingredient may be inserted between two molded articles separately molded or tentatively molded.

Also, the highly hydrated rice of the present invention may be stored as it is or as it is immersed in lukewarm water, water, broth, sauce, soup and the like or as it is immersed therein while changing water, or may be refrigerated after draining lukewarm water, water, broth, sauce, soup and the like, or may be refrigerated as it is immersed therein, or may after draining, be frozen, refrigerated after freezing, or frozen after refrigeration; otherwise, the highly hydrated rice after draining may be stored and/or refrigerated or frozen in the deoxygenated state where oxygen is prevented from contacting the hydrated rice.

In the highly hydrated rice of the present invention, water is absorbed nearly up to the water absorption level when the rice is boiled, so that the highly hydrated rice changes into tasty boiled rice only with steam-boiling or heating, advantageously without water adjustment which is the most troublesome work in boiling rice. Because the rice scarcely requires addition of water at heating, the highly hydrated rice of the present invention can be used for readily cooking delicious fried rice, dorria, paella and the like if the rice is commercially available as a raw material of fried rice, dorria, paella and the like together with seasoning materials. When the highly hydrated rice of the present invention is cooked for preparing rice gruel, furthermore, the rice is turned into tasty gruel for a short period of heating and without gumming the grain surface, which provides an extremely advantageous rice-gruel cooking method. Still furthermore, if the rice is in advance mixed with water, soup, sauce and the like for storage, the rice does not absorb additional water or does not soften unless the temperature is raised, so that the rice turns into fresh boiled rice products such as delicious rice gruel, hotchpotch, risotto and the like, with completely different tastes from those processed from conventional α-type products, as if the rice were just prepared from so-called raw rice.

Also, the highly hydrated rice of the present invention is frozen and dried, advantageously obtaining instant dry rice.

Since the highly water absorbed rice of the present invention uniformly absorbs 72 to 130 parts by weight of water to 100 parts by weight of rice, the rice when reconstituted with lukewarm water or heated after water addition may turn into porous instant dry rice if the rice is frozen and dried as it is, advantageously providing boiled rice readily, as if just cooked.

Examples of the present invention will now be explained hereinbelow.

EXAMPLE 1

Rice was washed and immersed in water for 2 hours, followed by immersion in hot water at 98° C. under heating for 45 seconds and subsequent immersion in water at 30° C. for 30 minutes, which corresponds to the completion of first-stage water absorption. At the first-stage water absorption, the water absorption level was 86 parts by weight to 100 parts by weight of rice, and the temperature of the product was 29° C.

The resulting hydrated rice was placed in a freezer at −20° C. and frozen for one day.

Then, the frozen hydrated rice was charged in water at 20° C. and heated so as to maintain 20° C. for a 20-min process of immersion and water absorption.

The resulting hydrated rice absorbed 114 parts by weight of water to 100 parts by weight of rice, and was a highly hydrated rice without gelatinization of the grains.

One hundred-fifty grams of the highly hydrated rice were placed in a plastic container, which was then covered in wrappings, and the rice was processed with a microwave oven for 3 minutes, to prepare fluffy delicious boiled rice.

EXAMPLE 2

Rice was washed and immersed in water overnight, followed by immersion in hot water at 98° C. under heating for 40 seconds and subsequent immersion in water at 30° C. for 30 minutes, which corresponds to the completion of first-stage water absorption. At the first-stage water absorption, the water absorption level was 86 parts by weight to 100 parts by weight of rice, and the temperature of the product was 29° C.

The resulting hydrated rice was placed in a freezer at −30° C. and frozen for 5 days.

Then, the frozen hydrated rice was charged in water at 40° C. and heated so as to maintain a temperature of 40° C. for a 20-min process of immersion and water absorption. The water addition ratio was 114 parts by weight of water to 100 parts by weight of rice. The hydrated rice was subsequently further immersed in water at 10° C. for 8 minutes to produce highly hydrated rice.

The resulting hydrated rice absorbed 120 parts by weight of water to 100 parts by weight of rice, and was highly hydrated rice without gelatinization of the grain.

Using broth seasoned with soy sauce, sushi vinegar and the like instead of water at 10° C. as used at the final process in Example 1 or water at 20° C., hydrated rice, either colored or seasoned, could be obtained. The resulting hydrated rice was highly hydrated rice at 120 parts by weight of water to 100 parts by weight of rice, also nearly without gelatinization of the grains.

EXAMPLE 3

The hydrated rice produced at the first-stage of Example 1 was immediately placed in a refrigerator at 5° C. for several-day refrigeration.

Then at a second stage, the refrigerated hydrated rice was placed in water at 20° C. and heated so as to maintain 20° C. for 30-min process of immersion and water absorption.

The resulting hydrated rice absorbed 100 parts by weight of water to 100 parts by weight of rice, without gelatinization of the grains.

Using broth seasoned with soy sauce instead of water at 20° C. as used at the second stage in Example 1, the refrigerated hydrated rice prepared at the first stage was kept to 20° C. at an extent where the refrigerated hydrated rice did not appear above the water surface, for a subsequent 15-min process of immersion and water absorption.

The resulting hydrated rice absorbed 100 parts by weight of the broth to 100 parts by weight of rice, nearly without gelatinization of the grains.

EXAMPLE 4

The two types of highly hydrated rice obtained in Example 3 (each 50 g), were placed separately in a steamer lined with linen so that the two types of rice might not be mixed up, while 20 g of the ingredients of mixed rice were placed on the seasoned hydrated rice, followed by steaming for 8 minutes, to produce tasty, simple boiled rice and seasoned boiled rice, without adjustment of the amount of water.

EXAMPLE 5

The highly hydrated rice obtained in Example 3 was poured at an appropriate rate into a teflon-made or plastic-made mold of a rice ball production apparatus, and heated in boiling water for 5 minutes in the state under pressure while the mold was closed with a lid in a forcing-in manner for tentative molding.

Loosening the lid so as to release the pressure while keeping the state as it is, the mold was put into a batch-wise steaming tank, followed by heating with steam at 105° C. for 5 minutes, to mold a rice ball.

Taking out the ball from the mold, a firm rice ball was prepared because the pressure from the expansion of the hydrated rice was also applied, which did not readily break down and which was a very delicious rice ball with a less water content. The water content of the prepared product was 103 parts by weight to 100 parts by weight of rice.

EXAMPLE 6

The highly hydrated rice using broth obtained in Example 3 was poured into a mold of a continuous box-type rice ball production apparatus of a boiled fish paste-plate size, at a level of seven/tenth the volume, on which were placed the cooked ingredients comprising seasoned chicken and vegetables, over which was then poured the highly hydrated rice, followed by closing the mold with a lid in a forcing-in manner and placing continuously the mold in a steaming tank, which was subsequently heated with steam at 105° C. for 5 minutes, to tentatively mold a stick-type rice ball.

Loosening the lid so as to release the pressure while keeping the state as it is, the mold was put into a steaming tank, followed by heating with steam at 105° C. for 5 minutes, to produce a stick-type rice ball.

Taking out the ball from the mold, the highly hydrated rice was prepared into α type, and firmly molded under the pressure from the expansion of the hydrated rice, which did not readily break down. Even if the rice ball was picked up with hands while hot, the ball did not lose its shape.

EXAMPLE 7

The highly hydrated rice obtained in Example 3 was poured at an appropriate rate into a teflon-made mold of a rice ball production apparatus, into which was inserted one pickled ume followed by closing the mold with a lid and continuously pressurizing the mold for tentative molding, and subsequently, the tentatively molded rice ball was taken out from the mold, and placed into another metal-made molding box and then placed into a second heating tank, followed by heating with steam under pressure at 110° C. for about 10 minutes, to mold a rice ball.

Taking out the ball from the molding box, an overall firm rice ball was prepared.

When direct flame is used at the final stage, the ball is immediately processed into a baked rice ball. In that case, the molding box may be present as it is or the box may be taken out. Even if the ball was re-steamed, the ball was still firmly molded, and if the re-steamed ball were picked up while hot, the ball did not lose its shape.

EXAMPLE 8

The highly hydrated rice obtained in Example 3 was poured at an appropriate rate into a teflon-processed metal-made mold of a rice ball production apparatus, into which was inserted seasoned eel, followed by pressurizing for tentative molding, and subsequently, the ball was taken out and placed in another mold, followed by firmly closing the mold with a lid and heating in boiling water for about 15 minutes, and then, the ball was taken out from the mold, and a rice-ball-like product with eel placed on top was prepared. Furthermore, after freezing the resulting product and re-steaming the product again one month later, the product tasted delicious and could be picked up and eaten with the hands while hot.

EXAMPLE 9

One hundred-twenty grams of cream soup obtained by diluting 100 g of a commercially available white cream soup were mixed with 40 g of the highly hydrated rice obtained in Example 3 and heated in a microwave oven for 4 minutes, to prepare very delicious risotto, which while very hot still had a pasta-like feel to teeth.

Following the same manner, saffron soup and fish and shell fish were mixed, and the pot was heated on direct gas flame for 5 minutes, to prepare marvelous paella.

EXAMPLE 10

Fifty grams of the highly hydrated rice obtained in Example 2 were packaged in a retort bag and stored in a refrigerator for several days, and subsequently, pin holes were opened through the bag, which was heated with a 500-W microwave oven for 1 minute and 30 seconds, and when the bag expanded, the bag was taken out from the microwave oven and left to stand for 1 minute, and the bag was opened to taste the rice, which was comparable to boiled rice produced just by cooking general rice with care. In case the hydrated rice was immersed in broth, the rice turned into tasty cha-meshi as in the case above.

EXAMPLE 11

One hundred-twenty grams of water were added to 50 g of the highly hydrated rice of Example 1 in a plastic container and heated in a 500-W microwave oven for about 5 minutes, and thus, very delicious rice gruel was prepared with no boiling over due to the short heating time.

EXAMPLE 12

Fifty grams of the highly hydrated rice of Example 2, 120 g of broth, chicken and a slight amount of a Chinese cabbage were placed together in a pot and heated on direct flame for about 3 to 4 minutes, to prepare very tasty chicken hotchpotch.

EXAMPLE 13

The highly hydrated rice of Example 2 was divided at each weight of 50 g in containers or retort bags and left to stand in a freezer for about 10 days, followed by sealing the containers with wrappings or by opening pin holes in the retort bags, which were then placed as they were in the frozen state in a 500-W microwave oven for 2 minutes and then left to stand for 1 minute before serving, and thus, the rice turned into very delicious simple boiled rice, cha-meshi and the like, as in the case described above.

EXAMPLE 14

Placing the highly hydrated rice of Example 1 into a variety of heat resistant containers or plastic containers (microwave oven-safe), storing the containers under freezing or refrigeration, mixing about 10 g of the ingredients of mixed rice in the rice, and sealing the containers with wrappings, prior to heating for several minutes and mixing up, very hot mixed rice may be thus prepared and tasted delicious as in the case described above.

EXAMPLE 15

In case of the highly hydrated rices of Examples 1 to 3, any of the rices may be prepared on several-minute heating into simple boiled rice, a variety of mixed rice, cha-meshi, and rice gruel, hotchpotch, risotto and the like, with the addition of water or broth, more or less involving the difference in shelf life between storage under freezing and under refrigeration and the slight variation in heating time.

EXAMPLE 16

Molding the highly hydrated rice of Example 1 and subsequently drawing out the rice from molds followed by sufficient freezing and placing the rice in a plastic molding box, and heating the rice in a 500-W microwave oven for about 3 minutes, various forms of firmly molded and tasty articles were readily produced, by modifying molds for molding and molding boxes for thawing, which articles were molded articles of boiled rice for convenience, which were not broken when the articles were picked up while hot. Depending on the molds used, tasty molded articles could be produced only by freezing the products after molding without using molding boxes at thawing.

EXAMPLE 17

Three kilograms of the highly hydrated rice obtained in Example 1 were charged in a vacuum refrigerating machine of a single maximum vaporization level of 10 kg (1 m×1 m×2 m, an experimental machine of a volume of 2 m$^3$), and frozen at −70° C., followed by adjustment to 20 torr (−740 mmHg), and under heating depending on the quantity of heat, the resulting rice was dried and processed overnight, to produce 1.2 kg of dry rice.

One hundred-twenty grams of the resulting dry rice were placed in a heat resistant container, to which was added a sufficient amount of boiling water followed by discarding the hot water 4 minutes later, and the resulting rice was served one minute later, which was very delicious boiled rice.

What is claimed is:

1. A process for producing a highly hydrated non-boiled rice for processing in a short period of time by using a microwave oven of which the water content has been controlled such that a delicious boiled rice is produced therefrom by said processing using a microwave oven in a short period of time with no addition of water thereto, which comprises the following steps:

(1) firstly preparing a rice absorbing water in the amount of 60 to 90 parts by weight per 100 parts by weight of raw rice by using raw rice or rice immersed in water and by using hot water having a temperature of 60° C. or more;

(2) freezing the rice obtained in step (1) at a temperature of −20° to −40° C.;

(3) immersing the resultant frozen hydrated rice obtained in step (2) in a liquid selected from the group consisting of water, broth, soup, and sauce, said liquid being maintained at a temperature of 15° to 25° C. whereby a total amount of hydrated in rice is rendered 110 to 120 parts by weight per 100 parts by weight of raw rice.

2. A process for producing a highly hydrated unboiled rice which can be processed in a short period of time in a microwave oven, whereby the water content of said highly hydrated unboiled rice being controlled such that a cooked rice product can be obtained by heating said highly hydrated unboiled rice in a microwave oven in a short period of time without addition of water thereto, said process comprising the following steps:

(a) preparing a hydrated rice comprising 60 to 90 parts weight absorbed water per 100 parts by weight of raw rice comprising immersing raw rice in hot water having a temperature of at least 60° C.;

(b) freezing the hydrated rice obtained in step (a) at a temperature of −20° to −40° C.; and (c) immersing the resultant frozen hydrated rice obtained in step (b) in a liquid selected from the group consisting of water, broth, soup, and sauce, said liquid being maintained at a temperature of 15° to 25° C. to produce a highly hydrated unboiled rice, whereby the total amount of absorbed water in said highly hydrated unboiled rice is from 110 to 120 parts by weight per 100 parts by weight of raw rice.

3. An unboiled highly hydrated rice product obtained according to the process of claim 2.

* * * * *